United States Patent
Hasting et al.

(10) Patent No.: US 11,709,702 B2
(45) Date of Patent: Jul. 25, 2023

(54) WORK CONSERVING, LOAD BALANCING, AND SCHEDULING

(71) Applicant: Intel Corporation, Santa Clara, CA (US)

(72) Inventors: Joseph R. Hasting, Orefield, PA (US); William G. Burroughs, Macungie, PA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/777,102

(22) Filed: Jan. 30, 2020

(65) Prior Publication Data

US 2020/0241915 A1 Jul. 30, 2020

Related U.S. Application Data

(63) Continuation of application No. 15/089,522, filed on Apr. 2, 2016, now Pat. No. 10,552,205.

(51) Int. Cl.
*G06F 9/46* (2006.01)
*G06F 9/48* (2006.01)
*G06F 9/50* (2006.01)

(52) U.S. Cl.
CPC ............ *G06F 9/4843* (2013.01); *G06F 9/505* (2013.01)

(58) Field of Classification Search
CPC ..................................................... G06F 9/4843
USPC ....................................................... 718/104
See application file for complete search history.

(56) References Cited

U.S. PATENT DOCUMENTS

| 8,656,392 B2* | 2/2014 | Erignac ...................... G06F 9/52 |
| | | 718/100 |
| 10,552,205 B2 | 2/2020 | Hasting et al. |
| 2002/0099759 A1* | 7/2002 | Gootherts ............. G06F 9/5088 |
| | | 718/105 |
| 2005/0188372 A1* | 8/2005 | Inoue ..................... G06F 9/4856 |
| | | 718/100 |
| 2005/0188373 A1* | 8/2005 | Inoue ..................... G06F 9/5038 |
| | | 718/100 |

(Continued)

OTHER PUBLICATIONS

International Search Report and Written Opinion for Application No. PCT/US2017/017348, dated May 19, 2017, 17 pages.

(Continued)

*Primary Examiner* — Mehran Kamran
(74) *Attorney, Agent, or Firm* — Hanley, Flight & Zimmerman, LLC

(57) ABSTRACT

A system and method are described for work conserving, load balancing, and scheduling by a network processor. For example, one embodiment of a system includes a plurality of processing cores, including a scheduling circuit, at least one source processing core that generates at least one task and at least one destination processing core that receives and processes the at least one task, and generates a response. The scheduling circuit of the exemplary system receives the at least one task and conducts a load balancing to select the at least one destination processing core. In an embodiment, the scheduling circuit further detects a critical sequences of tasks, schedules those tasks to be processed by a single destination processing core, and, upon completion of the critical sequence, conducts another load balancing to potentially select a different processing core to process more tasks.

21 Claims, 13 Drawing Sheets

(56) References Cited

U.S. PATENT DOCUMENTS

| | | | | |
|---|---|---|---|---|
| 2006/0056406 A1* | 3/2006 | Bouchard | ............... | H04L 12/56 370/389 |
| 2008/0065803 A1* | 3/2008 | Utsumi | ................... | G06F 13/24 710/260 |
| 2008/0077928 A1* | 3/2008 | Matsuzaki | ............ | G06F 9/5044 718/104 |
| 2008/0250260 A1* | 10/2008 | Tomita | .................. | G06F 1/3203 713/340 |
| 2009/0089782 A1* | 4/2009 | Johnson | ................ | G06F 1/3203 718/100 |
| 2009/0165014 A1* | 6/2009 | Park | ...................... | G06F 9/4856 718/105 |
| 2009/0254774 A1* | 10/2009 | Chamdani | ............. | G06F 9/4881 707/999.005 |
| 2010/0083259 A1* | 4/2010 | Veal | ......................... | H04L 47/10 718/102 |
| 2010/0131955 A1* | 5/2010 | Brent | .................... | G06F 9/4881 718/103 |
| 2010/0185882 A1* | 7/2010 | Arnold | .................. | G06F 9/4893 713/320 |
| 2010/0293353 A1* | 11/2010 | Sonnier | ................. | H04L 49/109 711/170 |
| 2010/0318996 A1* | 12/2010 | Harris | ................... | G06F 9/5033 718/104 |
| 2010/0319005 A1* | 12/2010 | Erignac | ..................... | G06F 9/52 719/315 |
| 2010/0332883 A1* | 12/2010 | Saxe | ..................... | G06F 9/5033 713/300 |
| 2011/0225589 A1* | 9/2011 | Pirog | .................... | G06F 9/3851 710/305 |
| 2011/0276978 A1* | 11/2011 | Gaiarsa | ................. | G06F 9/5033 718/104 |
| 2011/0282832 A1* | 11/2011 | Rishel | .................... | G06F 16/27 707/E17.007 |
| 2012/0036510 A1* | 2/2012 | Albers | .................. | G06F 9/4887 718/102 |
| 2012/0131283 A1* | 5/2012 | Mital | .................... | H04L 49/109 711/144 |
| 2012/0227056 A1* | 9/2012 | Ralston | .................. | G06F 9/541 717/106 |
| 2013/0339971 A1* | 12/2013 | Boland | ................. | G06F 9/4881 718/104 |
| 2014/0047452 A1* | 2/2014 | Ceze | ..................... | G06F 9/5027 718/104 |
| 2015/0040136 A1* | 2/2015 | Matthes | ................ | G06F 9/5094 718/104 |
| 2015/0058861 A1* | 2/2015 | Zheng | ....................... | G06F 9/50 718/104 |
| 2015/0121387 A1* | 4/2015 | Chang | ................... | G06F 9/4881 718/103 |
| 2015/0324234 A1* | 11/2015 | Chang | .................. | G06F 9/5016 718/104 |
| 2016/0103709 A1* | 4/2016 | Zhang | ...................... | G06F 9/50 718/103 |
| 2017/0075720 A1* | 3/2017 | Kogan | .............. | H04Q 3/54541 |
| 2017/0083588 A1* | 3/2017 | Lang | ................. | G06F 16/24526 |
| 2017/0090999 A1* | 3/2017 | Weber | ..................... | G06F 9/528 |
| 2017/0102971 A1* | 4/2017 | Blagodurov | .......... | G06F 9/5038 |
| 2017/0279703 A1* | 9/2017 | Wasmundt | .......... | H04L 67/1008 |
| 2018/0046507 A1* | 2/2018 | Borlick | ................ | G06F 9/4887 |
| 2018/0113737 A1* | 4/2018 | Borlick | ................ | G06F 9/4887 |

OTHER PUBLICATIONS

Non-Final Office Action received for U.S. Appl. No. 15/089,522, dated May 3, 2019, 21 pages.

Notice of Allowance received for U.S. Appl. No. 15/089,522, dated Oct. 10, 2019, 8 pages.

The International Bureau of WIPO, "International Search Report and Written Opinion," for Application No. PCT/US20171017348, dated May 19, 2017, 15 pages.

United States Patent and Trademark Office, "Non-Final Office Action," issued in connection with U.S. Appl. No. 15/089,522, dated on May 3, 2019,19 pages.

United States Patent and Trademark Office, "Notice of Allowance," issued in connection with U.S. Appl. No. 15/089,522, dated on Oct. 10, 2019, 8 pages.

The International Bureau of WIPO, "International Preliminary Report of Patentability," issued in connection with application No. PCT/US2017/017348, dated on Oct. 2, 2018, 13 pages.

* cited by examiner

WORK CONSERVING, LOAD BALANCING, AND SCHEDULING

TECHNICAL FIELD

Embodiments described herein relate generally to network processors. In particular, embodiments described relate generally to work conserving, load balancing, and scheduling.

BACKGROUND

Network processors are generally used for analyzing and processing packet data for routing and switching packets in a variety of applications, such as network surveillance, video transmission, protocol conversion, voice processing, and internet traffic routing.

A typical network processor includes multiple general-purpose processors and multiple hardware accelerators. In such a system, the general-purpose processors can make decisions on a dynamic, packet-by-packet basis, and provide data packets to the hardware accelerators or other processors that are required to process each packet.

BRIEF DESCRIPTION OF THE DRAWINGS

The various advantages of the embodiments described herein will become apparent to one skilled in the art by reading the following specification and appended claims, and by referencing the following drawings, in which:

DETAILED DESCRIPTION

Figure 1:
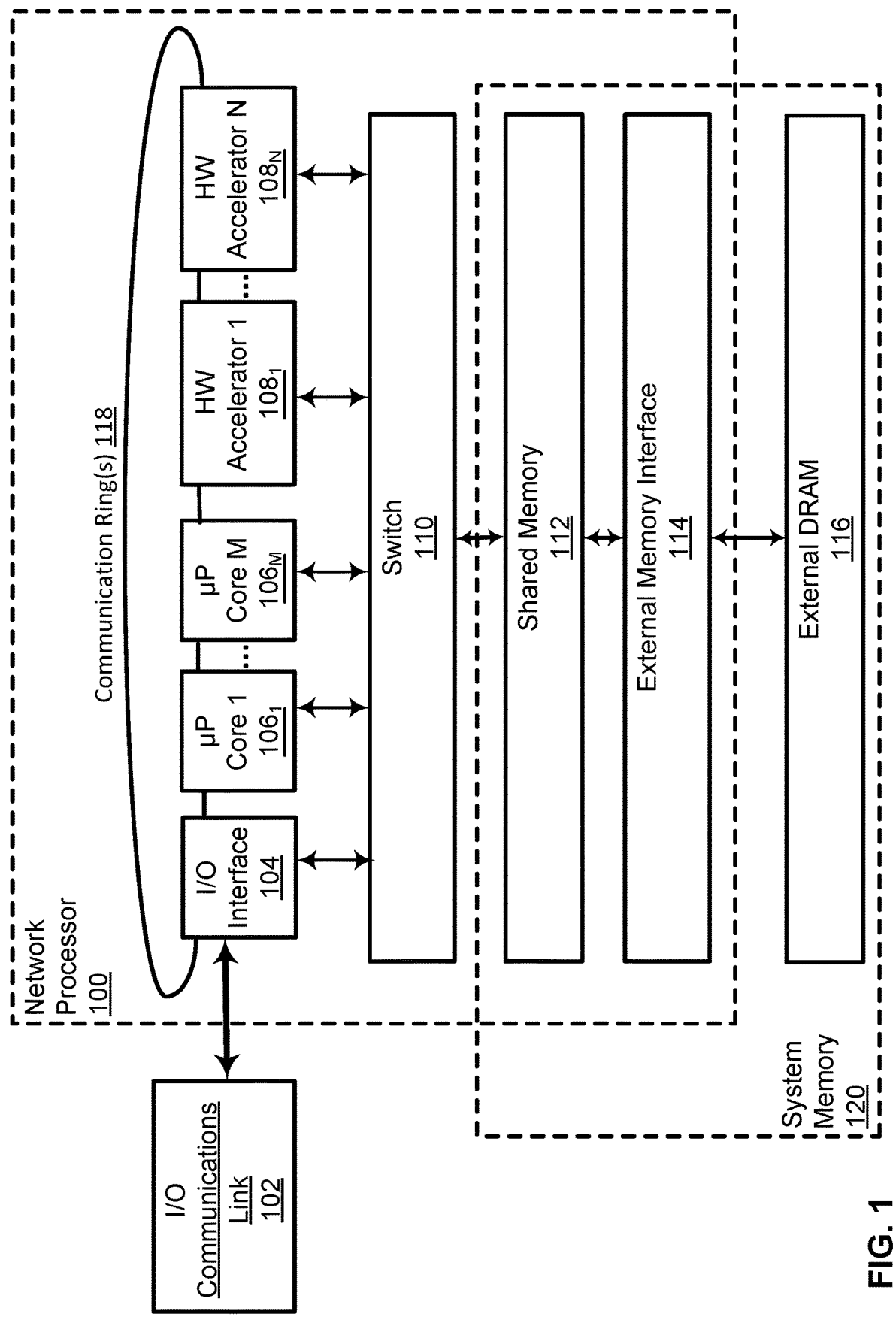
FIG. 1 shows a block diagram of a network processor operating in accordance with exemplary embodiments.

In the following description, numerous specific details are set forth. However, it is understood that embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Conventional network processors frequently suffer from non-optimal scheduling that degrades system performance or functionality. In some instances, network processors schedule processors speculatively, which can yield unpredictable performance when packets are not available to be processed. In other instances, a single long flow of packets may be unwittingly scheduled for execution by a single processor, stalling other flows and degrading load balancing. In other instances, conventional scheduling schemes fail to assign a critical flow of packets to a single processor to be executed atomically. In other instances, non-work conserving scheduling strategies make sub-optimal use of processing resources.

As used herein, a "flow" is a series of packets that share at least some common header characteristics (e.g., packets flowing between two specific addresses). When packets arrive at the network processor, tasks are derived from the packets, the flow to which the tasks belong is assigned (e.g., by accessing the packet's header data) and a flowID is generated. The flowID (or a pointer to a location in a memory buffer) is stored in a queue in a memory location. A scheduling circuit selects enqueued flowIDs and conducts load-balancing to select a destination processor or hardware accelerator to process the tasks.

According to embodiments disclosed herein, a scheduling circuit load-balances tasks among processing resources. The scheduling circuit detects a critical sequence of tasks within a flow and assigns that sequence to a single processing resource to be executed atomically. In some embodiments, critical sequences are parts of a task's execution code that access shared resources; tasks including such code must be executed atomically (by one processor at a time) to ensure correct behavior. The standard method to ensure atomic access is through software locking protocols that ensure mutual exclusion; but such protocols consume valuable processor cycles. Some embodiments disclosed herein eliminate the need for cycle-costly software locking protocols by scheduling critical sequences atomically. But when the critical sequence ends, the scheduling circuit frees up that flow to be re-load-balanced.

Also, in the case of multiple flows being assigned to a processor, in some embodiments, the scheduling circuit cycles through those flows, scheduling one or more tasks from each flow, so as to avoid allowing a single, long flow to disrupt other flows. In other embodiments, the scheduling circuit attempts to complete the scheduling for one flow before scheduling another flow.

Network Processor According to an Embodiment

FIG. 1 shows a block diagram of an exemplary network processor system (network processor 100). In some embodiments, the network processor 100 is implemented as a system-on-chip (SoC). Network processor 100 is used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and/or one or more hardware accelerators $108_1$-$108_N$, where M and N are integers greater than or equal to 1. Network processor 100 also includes external memory interface 114 for communication with external memory 116. External memory 116 is typically be implemented as a dynamic random-access memory (DRAM), such as a double-data-rate (DDR) DRAM, for off-chip storage of data. In some embodiments, such as shown in FIG. 1, each of the one or more I/O interfaces, μP cores and hardware accelerators may be coupled through switch 110 to shared memory 112. Switch 110 may be implemented as a non-blocking crossbar switch.

I/O interface 104 is typically be implemented as hardware that connects network processor 100 to one or more external devices through I/O communication link 102. I/O communication link 102 is generally be employed for communication with one or more external devices, such as a computer system or networking device, which interface with network processor 100. I/O communication link 102 may be a custom-designed communication link, or may conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In an embodiment, shared memory 112 is a conventional memory operating as a cache that is allocated and/or subdivided. For example, shared memory 112 may include one or more first in, first out (FIFO) queues that are dynamically allocated to the various μP cores $106_1$-$106_M$ and hardware accelerators $108_1$-$108_N$. External memory interface 114 couples shared memory 112 to one or more external memories, shown as external memory 116, to provide off-chip storage of data not currently in use by the various μP cores $106_1$-$106_M$ and hardware accelerators $108_1$-$108_N$ to free space in shared memory 112. As indicated by the dashed line, shared memory 112 and external memory 116 are generally be referred to as system memory 120. In general, system memory 120 is addressed as a single address space such that various accelerators $108_1$-$108_N$ can seamlessly request data whether the data is stored in shared memory 112 or external memory 116.

Hardware accelerators $108_1$-$108_N$ may interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a pipeline. In embodiments described herein, each of a plurality of pipelines operate by each processing circuit of network processor 100 receiving a task, executing that task, and assigning a subsequent task to another (or the same) processing circuit depending on an identification of a virtual pipeline corresponding to the task. As described herein, tasks are instructions to the destination core to perform certain functions. In some embodiments, at least one of the hardware accelerators $108_1$-$108_N$ includes scheduling circuitry.

Network processor 100 typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 may receive data packets from one or more active data streams concurrently from I/O communication link 102. I/O interface 104 parses the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are generated from data in shared memory 112 for one or more corresponding tasks and may be transmitted out of network processor 100. Exemplary I/O interfaces include Ethernet I/O adapters providing integrity checks of incoming data. The I/O adapters may also provide timestamp data for received and transmitted packets that may be used to implement features such as timing over packet (e.g., specified in the standard recommendations of IEEE 1588). In alternative embodiments, I/O interface 104 is implemented as input (receive) only or output (transmit) only interfaces.

The various μP cores $106_1$-$106_M$ and hardware accelerators $108_1$-$108_N$ of network processor 100 may include several types of processors or accelerators. The various hardware accelerators $108_1$-$108_N$ may include, but are not limited to, for example, one or more function-specific circuits, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose circuits.

The MTM is a software-driven accelerator that provides packet scheduling and possibly up to six levels of scheduling hierarchy. The MTM may support millions of queues and schedulers (enabling per flow queuing if desired). The MTM may provide support for shaping and scheduling with smooth deficit weighed round robin (SDWRR) for every queue and scheduler. The MTM may also support multicasting. Each copy of a packet is scheduled independently and traverses down one or more virtual pipelines enabling multicast with independent encapsulations or any other processing. The MTM may also contain a special purpose processor that can be used for fine-grained control of scheduling decisions. The MTM may be used to make discard decisions as well as scheduling and shaping decisions.

The SED is a software-driven accelerator that allows for editing of packets. The SED performs packet editing functions that may include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is a multi-threaded accelerator.

The SPP provides encryption/decryption capabilities and is a command-driven hardware accelerator, having the flexibility to handle protocol variability and changing standards with the ability to add security protocols with firmware upgrades. The ciphers and integrity (hash) functions may be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 may be dynamically allocated by the MMB to store data, with the blocks in one of the following sizes: 256, 2048, 16384, and 65536 bytes.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions may be supported, such as IP defragmentation. The PAB may also support generalized holding buffer and sliding window protocol transmit/retransmit buffering, providing an offload for features like TCP origination, termination, and normalization.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that used under software control for tasks such as connection timeout and retransmission timing. The MPP contains a statistics and state management engine, which when combined with the hash table and timer facilities, provides support for state-based protocol processing. The MPP may support millions of flows, limited only by the amount of DRAM capacity assigned to the functions. The MPP architecture may be able to store all per thread states in memory instead of in register files. The MPP may also include hash functionality.

Data Flow Through an Exemplary Network Processor

Figure 2:
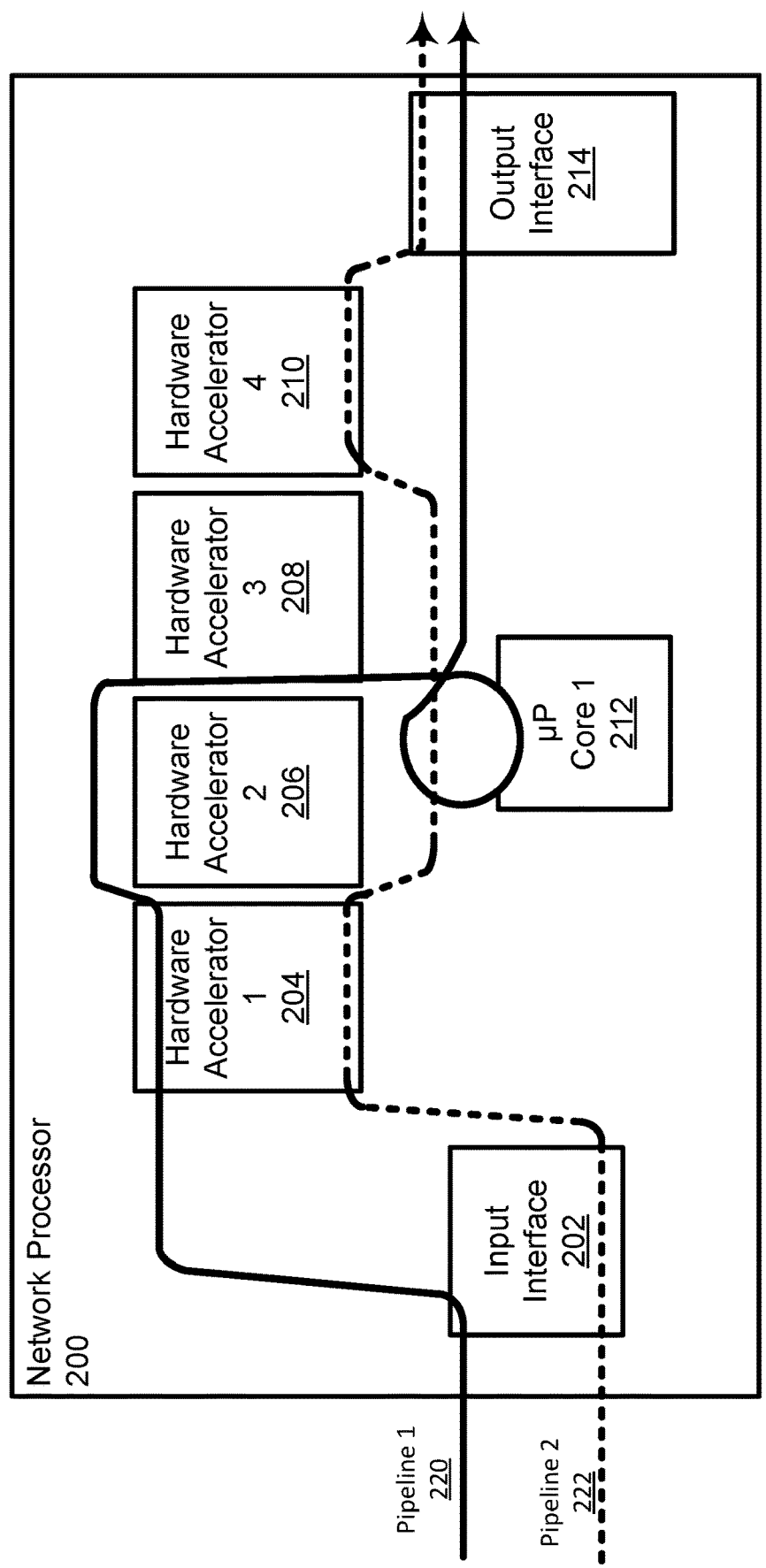
FIG. 2 shows an exemplary data flow of two virtual pipelines through a network processor.

In exemplary embodiments, pipelines determine (1) a flow sequence of processing circuits to be used for the task, (2) for each processing circuit, the required command and parameter fields, and (3) for each field, the source circuit of data output from a previous engine in the pipeline or data that is constant for the pipeline. FIG. 2 shows a flow of two exemplary pipelines through network processor 100. FIG. 2 shows a first pipeline sequence 220 for processing an exemplary packet, and a second pipeline 222 for processing another exemplary packet. As shown in FIG. 2, pipeline 220 defines a processing order starting at input interface 202 (such as the I/O interface 104 of FIG. 1), hardware accelerator 204, hardware accelerator 208, µP core 212, hardware accelerator 206, and finally output interface 214. However, another packet received by the input interface 202 may be processed in accordance with second pipeline 222. As shown in FIG. 2, pipeline 222 also defines a processing order starting at input interface 202 and hardware accelerator 204 but then proceeds to hardware accelerator 210 and then output interface 214. Processor core 212 and hardware accelerator 206 and 208 are not included in pipeline 222. Because only those hardware accelerators and µP cores that are required are included in a virtual pipeline, network processor 100 has increased efficiency of processing data packets.

Task Queue Structure

Figure 3:
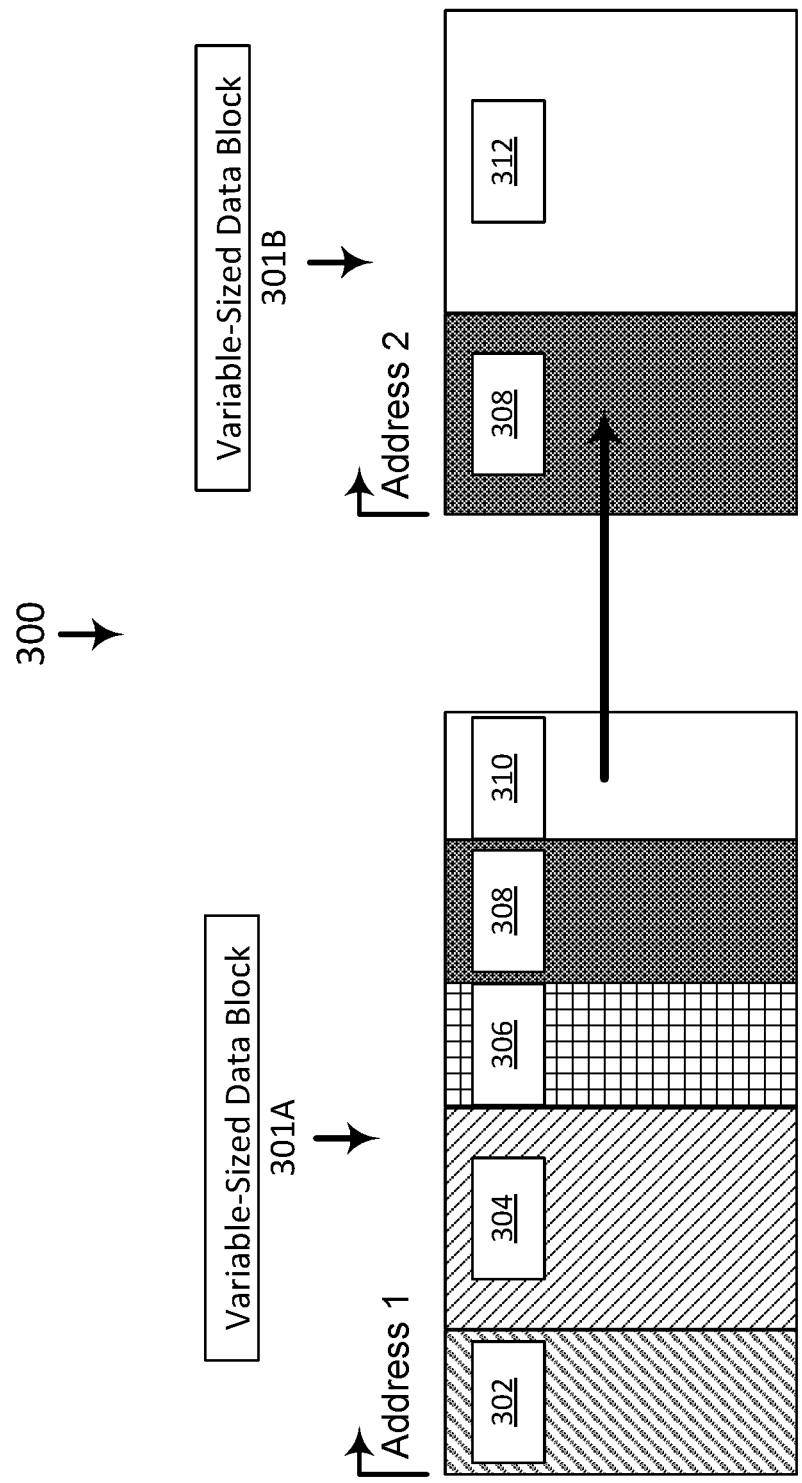
FIG. 3 shows a block diagram of an exemplary task queue structure of processing circuits of a network processor.

FIG. 3 shows a block diagram of an exemplary task queue structure of a destination core. As shown in FIG. 3, a first task 302 from a source processing circuit is stored in a queue in shared system memory 112, beginning at Address 1. Task 302 is followed by a second task 304 and a third task 306. Tasks 302-306 may be from any processing circuit (e.g., µP cores $106_1$-$106_M$ or hardware accelerators $108_1$-$108_N$) of network processor 100. Task 306 is followed by a fourth task 308. However, task 308 exceeds a memory boundary of the first memory block of queue 300. In exemplary embodiments described herein, the memory boundary of each block is 2 KB. Thus, as a source processing circuit writes task 308 to the queue, the source processing circuit appends link 310, which provides a pointer to a next, linked, block of memory where the remainder of the fourth task is stored, starting at Address 2. Empty space 312 in the second block is available for additional tasks to be stored therein. Although shown in FIG. 3 as being at the end of the variable-sized data block, link 310 may be placed anywhere within the variable-sized data block.

To transfer a task to a destination engine (e.g., a destination one of µP cores $106_1$-$106_M$ or hardware accelerators $108_1$-$108_N$), the source engine (e.g., a source one of µP cores $106_1$-$106_M$ or hardware accelerators $108_1$-$108_N$) sends a request on task ring 118. The destination engine responds with the address in system memory 120 where the task is to be written. Upon receiving the response, the source engine writes the task to the memory address, and sends an acknowledgment to the destination engine. The source processing circuit then writes the address of the next variable-sized data block to a fixed location (e.g., the given offset, or the end of the block) within the first block to create a link between the variable-sized data blocks. As described herein, the link does not necessarily have to be at the end of the variable-sized data block, but can be anywhere within the block. In exemplary embodiments, if tasks are each 256 B long and each link is 16 B long, the link may be written anywhere after byte 240 in a 2 KB block. The source processing circuit writes partial task data to the first block and any remaining task data to the second block. The destination processing circuit reads all the tasks sequentially and when it reaches the end of the variable-sized data block and there are more tasks to be read, it reads the link in the variable-sized data block. When the link comes back from system memory 120, the destination processing circuit continues to read the tasks. If the destination processing circuit is capable of consuming the tasks at a fast rate, the time to read the link may undesirably stall the destination processing circuit as it does not yet have an address from which to read the additional tasks.

Described embodiments prevent the destination processing circuit from stalling when tasks straddle a memory boundary (e.g., when an entire variable-sized data block is read). In described embodiments, the destination processing circuit tracks when task data is written for the first time to a variable-sized data block (e.g., the variable-sized data block is a new block). When task data is written for the first time to a new block, the destination processing circuit sends the address of the new block in the response to the destination engine. As described herein, the destination engine writes the full task and also the link within the variable-sized data block.

When the destination engine reads the first task out of a given variable-sized data block, the destination processing circuit also reads the link address. Thus, the link address is preloaded before the destination processing circuit has read all the tasks from the variable-sized data block, and thus the destination processing circuit is not stalled when task data straddles the memory boundary since the destination circuit can directly read task data from the next block located at the preloaded link address.

Distributing and Processing Tasks Among Processing Circuits

Figure 4A:
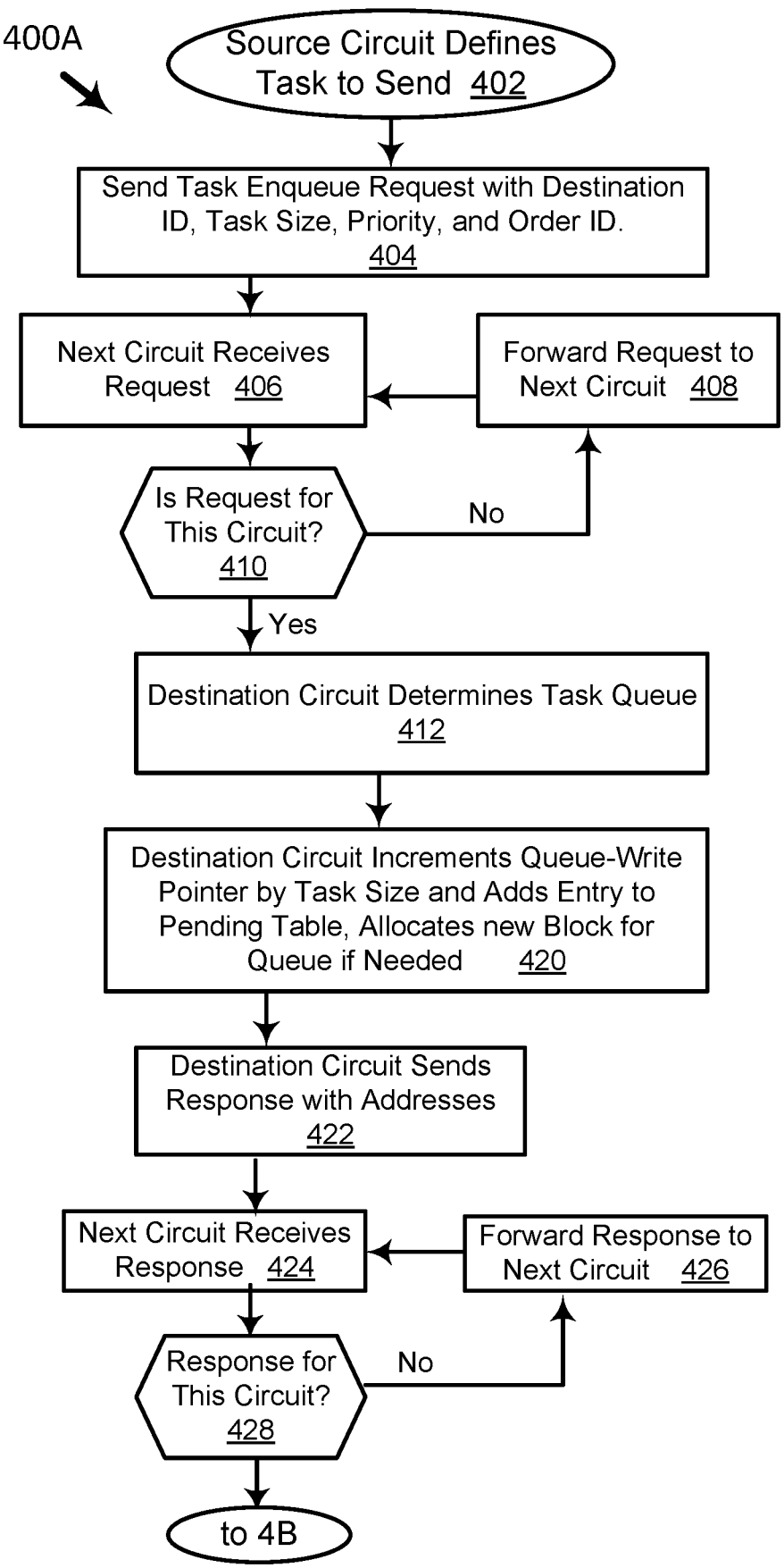
FIG. 4A shows part of a flow diagram of an exemplary process for sending and processing tasks between one or more processing circuits of a network processor.
Figure 4B:
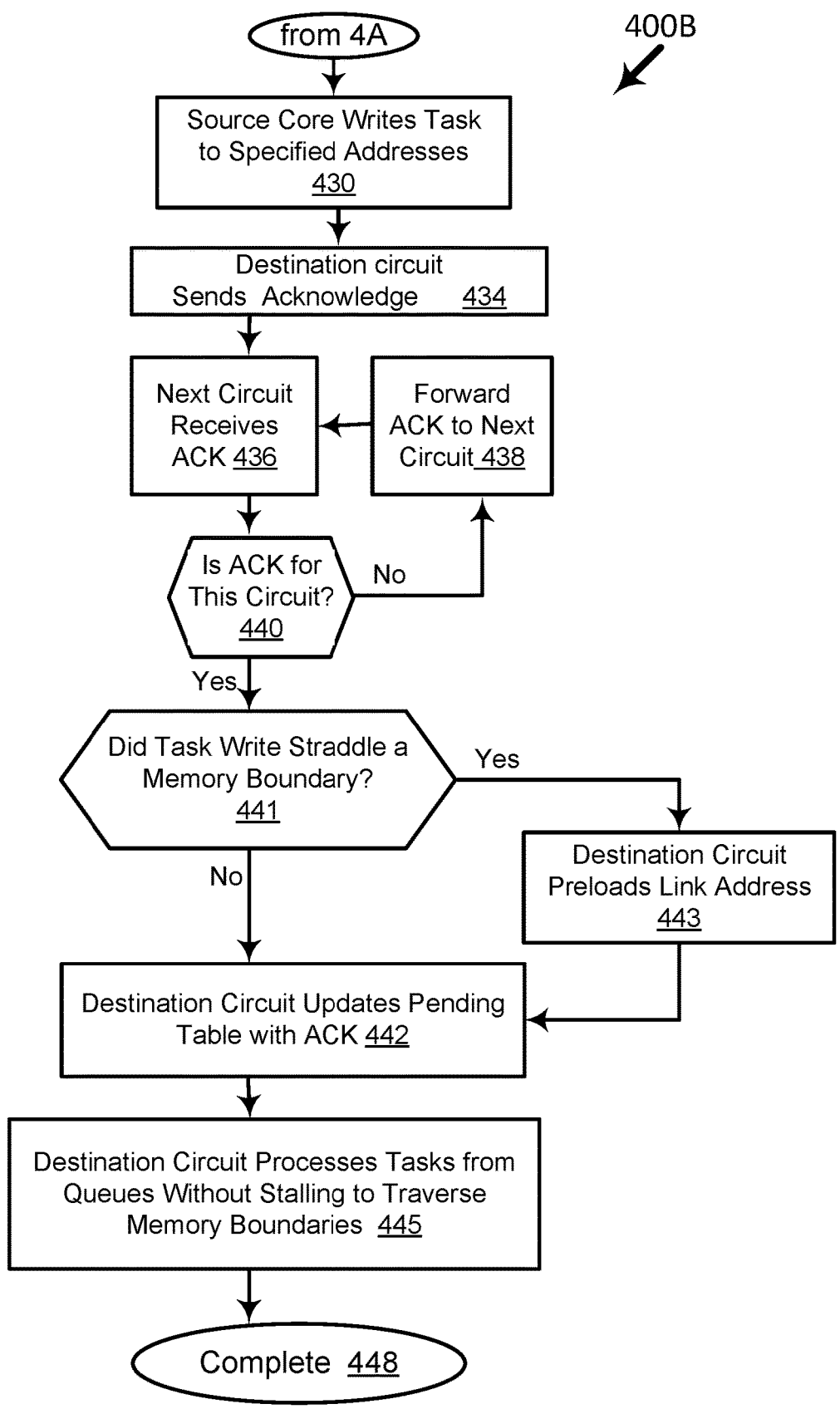
FIG. 4B shows another part of a flow diagram of an exemplary process for sending and processing tasks between one or more processing circuits of a network processor.

FIGS. 4A and 4B show a flow diagram of exemplary process 400A and 400B for sending tasks between one or more processing circuits of a network processor 100. Referring to FIG. 4A, at step 402, a source processing circuit generates a task to be performed by a destination processing circuit and, at step 404, the source core sends out a task request with the ID of the destination processing circuit and other data, such as the priority, ordering type and size of the task. In one embodiment, the one or more processing circuits communicate using one or more rings, such as communications ring(s) 118. In other embodiments, the one or more processing circuits communicate over one or more busses, including high-speed busses. In alternate embodiments, the one or more processing circuits communicate over point-to-point links. Additional alternate communication links among the one or more processing circuits, including wireless communications, exist. The task request moves from processing circuit to processing circuit until the destination processing circuit receives the request, as illustrated in steps 406-410. At step 412, the destination circuit determines which of its task queues is to store the task, or whether the queue is full. At step 420, the Destination Circuit Increments Queue-Write Pointer by Task Size and Adds Entry to Pending Table, Allocates new Block for Queue if Needed.

At step 422, the destination processing circuit responds to the source processing circuit with the memory address at which to write the new task, and the response propagates along circuits until reaching the source core in steps 424-426 (forward response to next circuit), and 428 (test whether response is for this circuit). As described, when the associated variable-sized data block becomes full, the destination processing circuit sends two addresses in the response to the sourcing engine: (i) the address with the first variable-sized data block to start writing the task, and (ii) the beginning address of a next variable-sized data block in shared memory 112. If the associated variable-sized data block is not full, the destination processing circuit sends one address in the response to the sourcing engine: the address within the first variable-sized data block to start writing the task.

Referring now to FIG. 4B, at step 430, the source core writes the task at the specified address(es) and, at step 434, the destination processing circuit sends an acknowledgement. The acknowledgment indicates that the task data is ready to be read from memory. The acknowledgement propagates along the circuits until the source processing circuit receives the acknowledgement at steps 436 (next circuit receives acknowledge), 438 (forward acknowledge to next circuit), and 440 (test whether acknowledge is for this circuit). At step 441, if the task write straddled a memory boundary (e.g., task data was written to more than one variable-sized data block), then at step 443, the destination processing circuit preloads the link address value to a local memory, and process 400 proceeds to step 442. Otherwise, at step 441, if the task write did not straddle a memory boundary (e.g., task data was written to only one variable-sized data block), then process 400 proceeds to step 442. At step 442, the destination processing circuit updates a table of pending tasks with the acknowledgement. Since there could be several tasks being written in a given queue at any time, the queues are able tolerate gaps in the queue if a later arriving task completes a write to cache before the earlier task finishes writing the queue. At step 445, the destination processing circuit reads a next task from the task queue (or from one of multiple task queues). Since link address values are preloaded by the destination processing circuit each time a task write straddles a memory boundary, at step 445, the destination processing circuit processes tasks from the queue(s) without stalling to read a link memory address. At step 448, process 400 completes.

Work Conserving Flow Control Accommodating Atomic Processing of Critical Tasks

Figure 5:
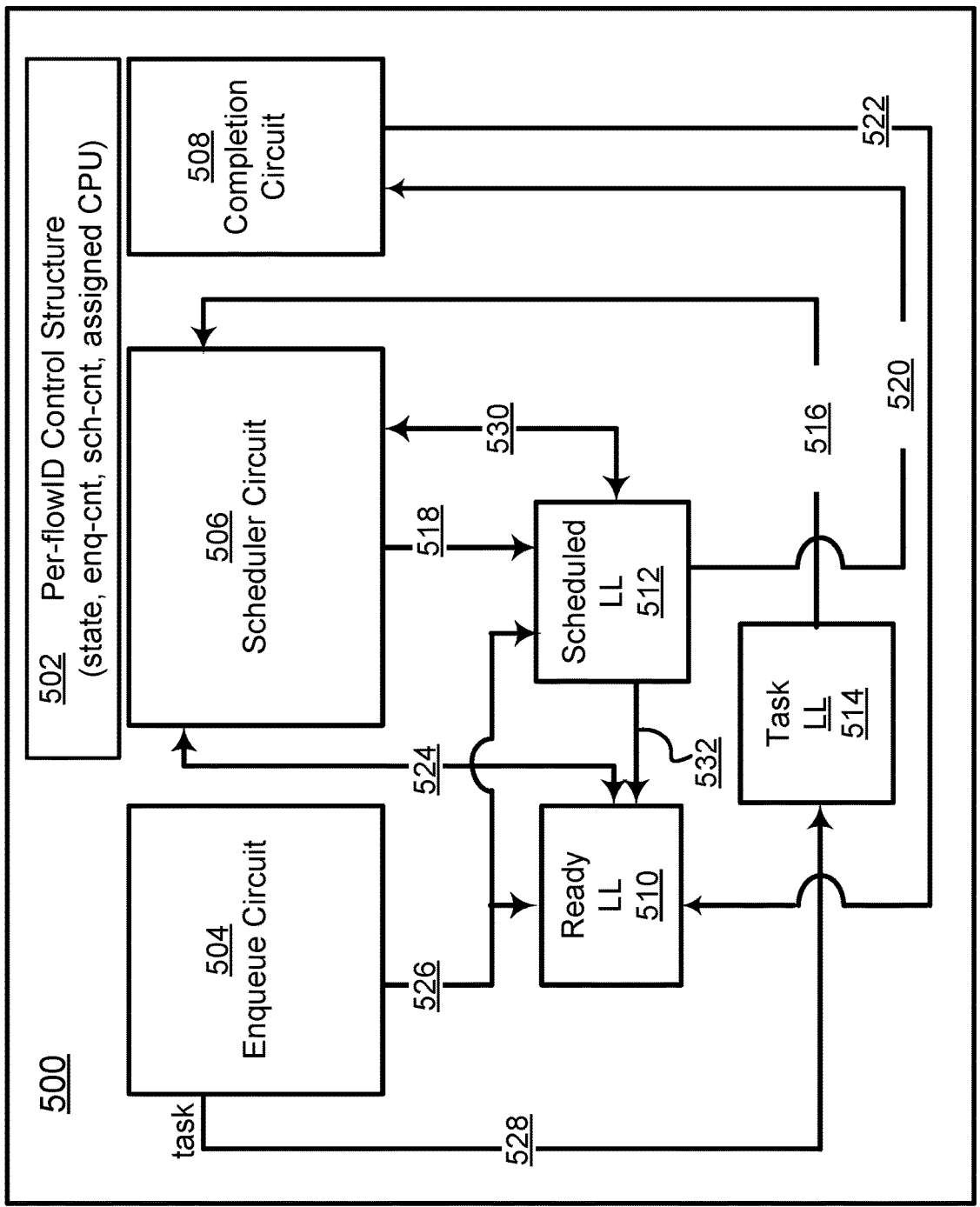
FIG. 5 shows hardware for implementing a scheduling circuit according to an embodiment.
Figure 8:
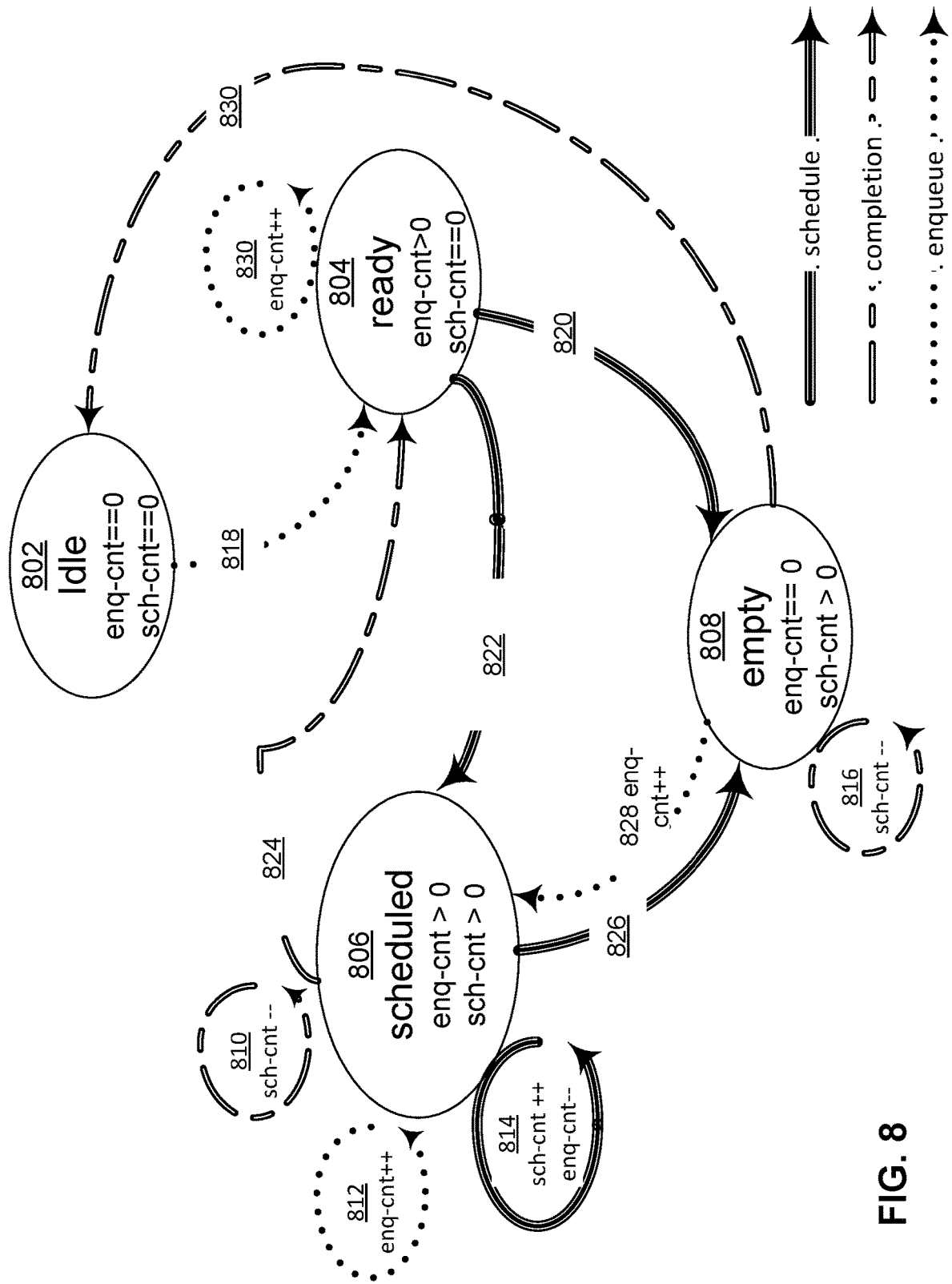
FIG. 8 shows a state diagram for a work conserving scheduling and processing of task flows according to an embodiment.

FIG. 5 shows hardware for implementing a scheduling circuit according to an embodiment. In some embodiments, the scheduling circuit 500 utilizes hardware circuitry of a hardware accelerator. In other embodiments, scheduling circuit 500 is implemented as a hardware circuit that communicates with the processors and hardware accelerators of a network processor. As illustrated, the hardware components of scheduling circuit 500 in an embodiment perform a process as illustrated in FIG. 8. Scheduling circuit 500 is implemented in some embodiments by enqueue circuit 504, scheduler circuit 506, and completion circuit 508.

Enqueue circuit 504 in an embodiment receives packets and extracts one or more tasks from each one. Enqueue circuit 504 further writes the task to a linked list, task-LL 514, via circuit transition 528. In some embodiments, a linked list is a data structure consisting of a collection of nodes that represent a sequence, with each node consisting of a data element and a link to the next node in the sequence. In alternate embodiments, each node also consists of a backward link to the previous node in the sequence. In alternate embodiments, a linked list is implemented as a first-in, first-out buffer, a FIFO.

In an embodiment, enqueue circuit 504 creates a flowID control structure 502, which in an embodiment includes a flowID state, enqueue-count (enq-cnt), scheduled count (sch-cnt), an assigned processor ID, which is set when scheduler circuit 506 assigns the flowID to a destination processor. In an embodiment, a flowID represents an ordered list of tasks of a flow, which is a series of packets that share at least some common header characteristics. Each flow is associated with a flowID control data structure 502 to track the state of the flow, the number of tasks enqueued and ready to be assigned, the number of tasks having been scheduled to a destination processor, and the identity of the assigned destination processor. Enqueue circuit 504 associates the one or more tasks with a flow (either new or existing) and associates a flowID control structure with the flow. In an embodiment, enqueue circuit 504 pushes the flowID onto a linked list, ready-LL 510, via circuit transition 526, where it waits to be scheduled. In some embodiments, linked list ready-LL 510 is a data structure consisting of a collection of nodes that represent a sequence, with each node consisting of a data element and of a pointer pointing to the next node in the sequence. In alternate embodiments, each node also consists of a backward pointer pointing to the previous node in the sequence. In an embodiment, ready-LL 510 stores a flowID control structure, configured similarly to 502, with each of the stored flowIDs.

Scheduler circuit 506 in an embodiment pops a flowID from the ready-LL 510, for example via circuit transition 524 (illustrated as a bi-directional transition), reads its flowID control structure, which is formatted according to flowID control structure 502, conducts a load balancing, selects a destination processor or hardware accelerator that has a relatively low load compared to other processors and hardware accelerators, and pushes the flowID onto a linked list, scheduled-LL 512, for example via circuit transition 518. In some embodiments, linked list scheduled-LL 512 is a data structure consisting of a collection of nodes that represent a sequence, with each node consisting of a data element and of a pointer pointing to the next node in the sequence. In alternate embodiments, each node also consists of a backward pointer pointing to the previous node in the sequence. In some embodiments, scheduled-LL 512 stores a flowID control structure along which each of the flowIDs in scheduled-LL 512.

Scheduler circuit 506 in an embodiment pops a flowID from task-LL 516, for example via circuit transition 516, reads its flowID control structure, which is formatted according to flowID control structure 502, conducts a load balancing, selects a destination processor or hardware accelerator that has a relatively low load compared to other processors and hardware accelerators, and pushes the flowID onto a linked list, scheduled-LL 512, for example via circuit transition 518.

In an alternate embodiment, scheduler circuit 506 pops a flowID from scheduled-LL 512, for example via circuit transition 530, reads its flowID control structure, and determines that the flowID has not yet been assigned to a destination processor, in which case scheduler circuit 506 in an embodiment pushes the flowID onto ready-LL 510, for example via circuit transition 524, so that the flow can undergo a load balancing to determine a destination processor. In an alternate embodiment, scheduler circuit 506 pops a flowID from scheduled-LL 512, for example via circuit transition 530, learns from the flowID control structure that the flowID has not yet been assigned to a destination processor, and conducts a load balancing to select a destination processor. In an alternate embodiment, scheduler circuit 506 learns that the flowID popped from the schedule-LL is part of an atomic sequence of tasks, in which case scheduler circuit 506 assigns the flowID to the previously-assigned destination processor, as reflected in the flowID control data structure associated with the flow, so as to effect atomic scheduling.

In some embodiments, scheduler circuit 506 conducts a load balancing to determine a destination processor for a flowID popped off of ready-LL 510 or scheduled-LL 512. In other embodiments, enqueue circuit 504 conducts a load balancing to determine a destination processor when popping a flowID from the ready-LL 510 or when pushing a flowID onto ready-LL 510. When a flowID is active in the ready-LL 510 or is in the scheduled-LL 512 and not part of a critical sequence, all non-full destination processors are evaluated to determine which can receive the flow. Typically, priority is given to empty destination processors to improve load balancing. In some embodiments, each destination processor is configured with a set of source processors from which it can receive tasks with an associated priority. The enqueue circuit or scheduling circuit selects a destination processor that can receive the enqueued task and then selects the highest priority source processor with a task enqueued that it can receive from. To avoid starvation on the low priority task the scheduling circuit will use a random selection instead of the strict priority. This ensures that the circuit is work conserving since in an embodiment the scheduling circuit does not selected a destination processor if a task is not available to deliver. This selection can pop a flowID from either the ready LL 510 or scheduled-LL 512. When the flowID is popped then the control information is read and updated. When the flowID is processed then the highest priority task of the flow is popped from the task LL and it is delivered to the destination processor. The flowID can then be pushed back onto scheduled-LL 512 if more tasks are enqueued for the flow. In some embodiments, one task is processed each time a flowID is popped from a linked list, this is to address a scenario where a single flowID has a long list of enqueued tasks. FlowID with a long list of enqueued tasks limits the load balancing effectiveness of the scheduling circuit since the atomicity requires that a flow stay assigned to a single destination processor until all active processing completes. By processing 1 task from a flowID and then placing it at the end of the LL and interleaving processing active flowID prevents other linked lists from being stalled behind a long liked list and potentially also becoming a long list.

Completion circuit 508 in an embodiment receives an indication of completion from a destination processor or hardware accelerator. According to an embodiment, completion circuit 508 then reads flowID control 502 to determine the next state for the flowID.

Scheduler circuit 506 in an embodiment sends a signal to completion circuit 508, for example via circuit transition 520, letting the completion circuit know that a task was transmitted to a destination processor, and putting the completion circuit on the lookout for a completion response from the destination processor. Accordingly, in an embodiment, completion circuit 508, sends pushes the flowID back onto ready-LL 510, for example via circuit transition 522, so that additional tasks pending in the flow ID can be re-load balanced and processed.

When the destination processor completes operation on a task it returns a response to the scheduling circuit. The scheduling circuit associates the response to a flowID and reads the per-flowID control and decrements the sch-cnt. The state is updated and the flowID continues to be active if more tasks are awaiting a completion for the flowID or when all tasks are completed the flowID is terminated. In the case where all active tasks of a flowID have been completed and there are tasks enqueued the scheduling circuit will un-assign the flowID from the destination processor and move it back to the ready state so that it can be load balanced again.

Figure 6:
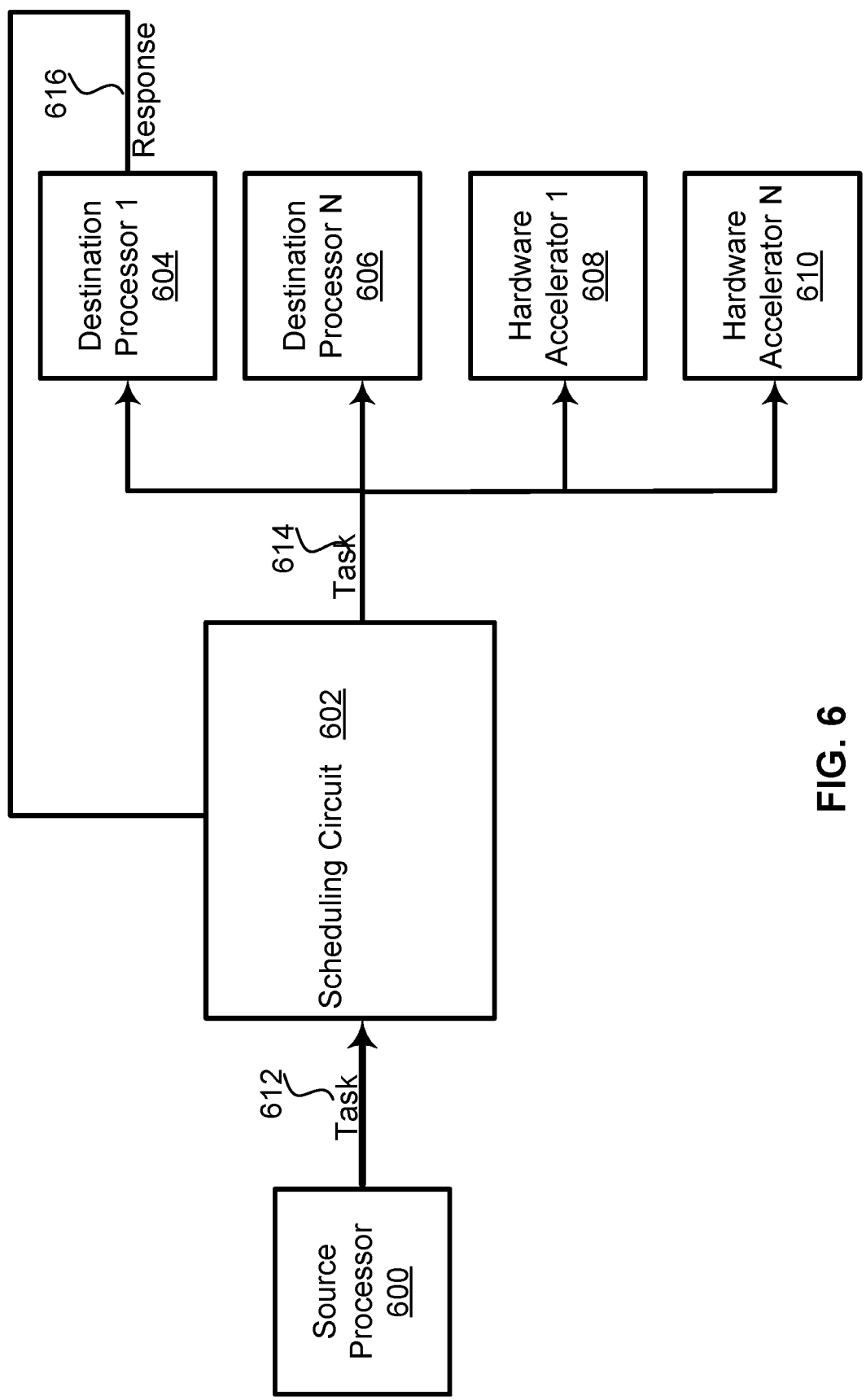
FIG. 6 shows a block diagram illustrating an embodiment of a scheduling circuit that conducts work conserving, load balancing, and atomic scheduling of tasks among one or more processing circuits of an exemplary network processor.

Work Conserving Task Scheduling Among Processing Circuits of a Network Processor FIG. 6 shows a block diagram illustrating an embodiment of aspects of a network processor including a scheduling circuit that conducts work conserving, load balancing, and/or atomic scheduling of tasks among one or more processing circuits. As tasks are received, scheduling circuit 602 schedules them to be distributed to various processors for execution.

In some embodiments, tasks are used to communicate among I/O interface 104, processor cores $106_1$-$106_M$ (which are also referred to herein as microprocessor (μP) cores or microprocessor (μP) circuits, or processor circuits, or processing cores, or processing circuits), and hardware accelerators $108_1$-$108_N$ of network processor 100. In alternate embodiments, packets may be communicated. In other embodiments, shared memory locations may be used to exchange data. As illustrated, a task 612 is sent as a request from source processor 600 to a destination processor such as one of the destination processors 604 and 606, or one of the hardware accelerators 608 and 610. In this illustrative example, scheduling circuit 602 transmits the task to destination processor 604 as task 614, for the destination processor 604 to process.

Scheduling circuit 602 may be implemented within one of hardware accelerators 1 to N, $108_1$ to $108_N$, I/O Interface 104, processor cores 1-M, $106_1$ to $106_M$, or switch 110 of FIG. 1 or be independent of these devices.

Figure 12:
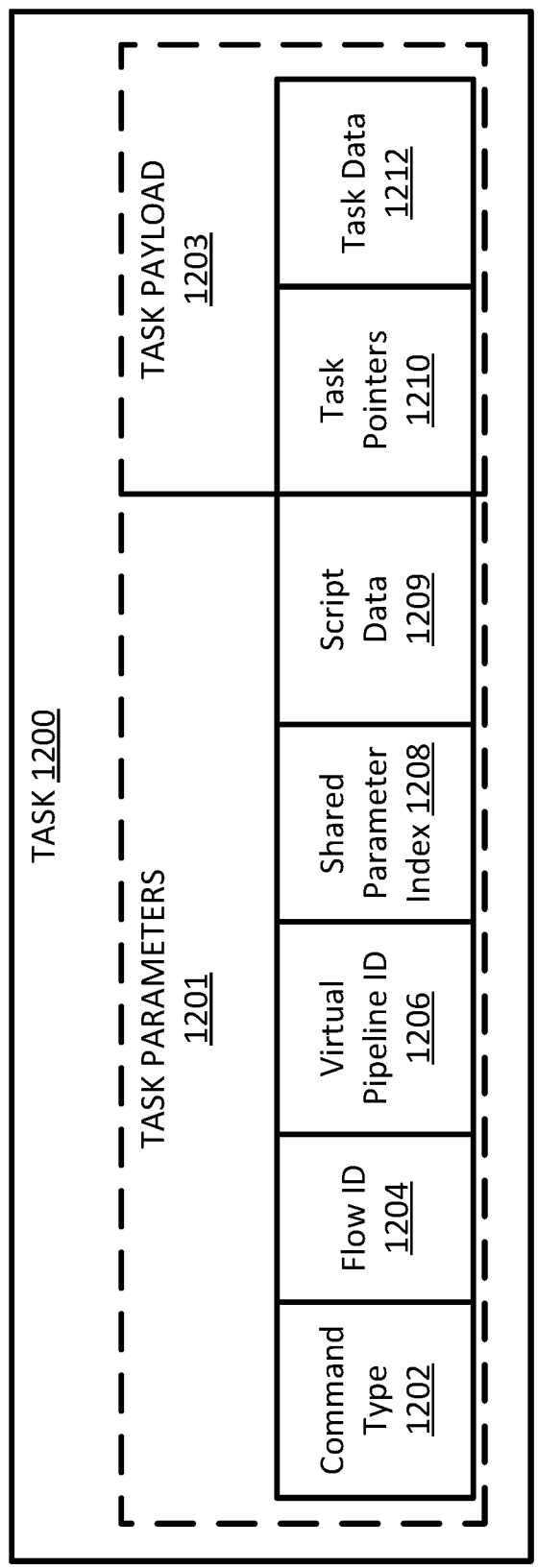
FIG. 12 illustrates a task data structure according to some embodiments.

In an embodiment, tasks 612 and 614 include a header and a payload, wherein the payload contains one or more of packet data, commands, metadata, pointers, control and parameter data, and/or other information, such as a priority level and flowID. In alternate embodiments, the headers of tasks 612 and 614 are communicated along with pointers to locations in system memory 120 where the payloads for the tasks may be stored. In an embodiment, tasks 612 and 614 point to the same location in system memory 120 where the payload is stored. FIG. 12, below, illustrates a task structure according to an embodiment.

To assign a task to a flowID, scheduling circuit 602, in one embodiment, uses information in a task header. For example, a task from a particular source processor to a particular destination processor is assigned to a particular flowID.

In selecting a destination processor to which to schedule a task, scheduling circuit 602 attempts to equally distribute tasks across multiple available processors and hardware accelerators according to an embodiment. In some embodiments, during the selection, the set of available destination processors to select from is determined by configuration. In an embodiment, the configuration uses a Source-Processor-ID received from or associated with the source processor to provide the set of destination processors to select from for load balancing. Multiple source processors can share the same ID or they can each have a unique ID.

According to an embodiment, when a critical sequence of tasks of a flow is assigned to a single destination processor, then all subsequent tasks of that critical sequence are delivered to the same destination processor, such that the critical sequence of tasks are processed atomically by that processor. But, when a flow includes tasks that are not part of a critical sequence, scheduling circuit 602 in some embodiments conducts a load balancing algorithm to assign the task to any of destination processors 1-N (604-606) or hardware accelerators 1-N (608-610). Furthermore, when the critical sequence of a particular flow reaches its end, scheduling circuit 602 in an embodiment no longer needs to restrict the tasks of that flow to a particular processor; scheduling circuit 602 in such a scenario pushes the flow onto the ready-LL 510 to be re-load balanced.

In an embodiment, scheduling circuit 602 waits for valid tasks to be enqueued and ready to be scheduled before scheduling tasks to any of destination processors 1-N (604-606) or hardware accelerators 1-N (608-610). In such an embodiment, scheduling circuit 602 does not speculatively schedule.

In periods of high activity, scheduling circuit 602 may schedule multiple flows to a particular one of destination processors 1 to N, 604 to 606, or hardware accelerators 1 to N, 608 to 610. In such a scenario, in one embodiment, scheduling circuit 602 cycles through all flows currently active on a processor, performing one or more tasks from each flow during each cycle to avoid a single long flow (with many tasks) from stalling other flows. In an alternative embodiment, scheduling circuit 602 schedules all tasks for a single flow before scheduling tasks from another flow. In an alternative embodiment scheduling circuit 602 selects flows for which to schedule tasks based on the number of tasks enqueued for each flow, or how long tasks of the flow have been waiting.

When all active tasks have been completed by a processor, scheduling circuit 602 in an embodiment removes the assignment of the flowID to the processor and the flowID can be re-load-balanced and assigned to a new processor to help distribute processing.

The destination processing circuit stores multiple variable-sized data blocks of tasks in an associated queue within shared system memory 112. In some embodiments, each processing circuit has multiple task queues associated therewith. In an embodiment, the task blocks are 2 kB. Assigning a task to a particular queue may depend on any one or more of several factors, such as whether the tasks are ordered tasks or unordered tasks, the number of tasks in a given queue, and the size or depth of the queue. Ordered tasks are processed atomically, and can be referred to as atomic tasks, while unordered tasks need not be processed atomically. Ordered task queues support parallel processing of tasks while keeping tasks for a given flow in order, while unordered tasks can be processed in any order. FIG. 12 illustrates a task structure according to an embodiment.

After completing the processing, destination processor 604 generates a response 616 that is routed back to scheduling circuit 602. When the associated variable-sized data block becomes full, the destination processing circuit sends two addresses in the response to the sourcing engine: (i) the address with the first variable-sized data block to start writing the task, and (ii) the beginning address of a next variable-sized data block in shared memory 112. Upon receiving response 616 from destination processor 604, Scheduling circuit 602 in some embodiments updates its internal states, including, for example, sch-cnt. If the task associated with response 616 was the last task of a critical sequence, and if the flow associated with response has more tasks enqueued, scheduling circuit 602 in some embodiments unbinds destination processor 604 from the flow, and conducts a load balancing to potentially assign a different destination processor.

Figure 7:
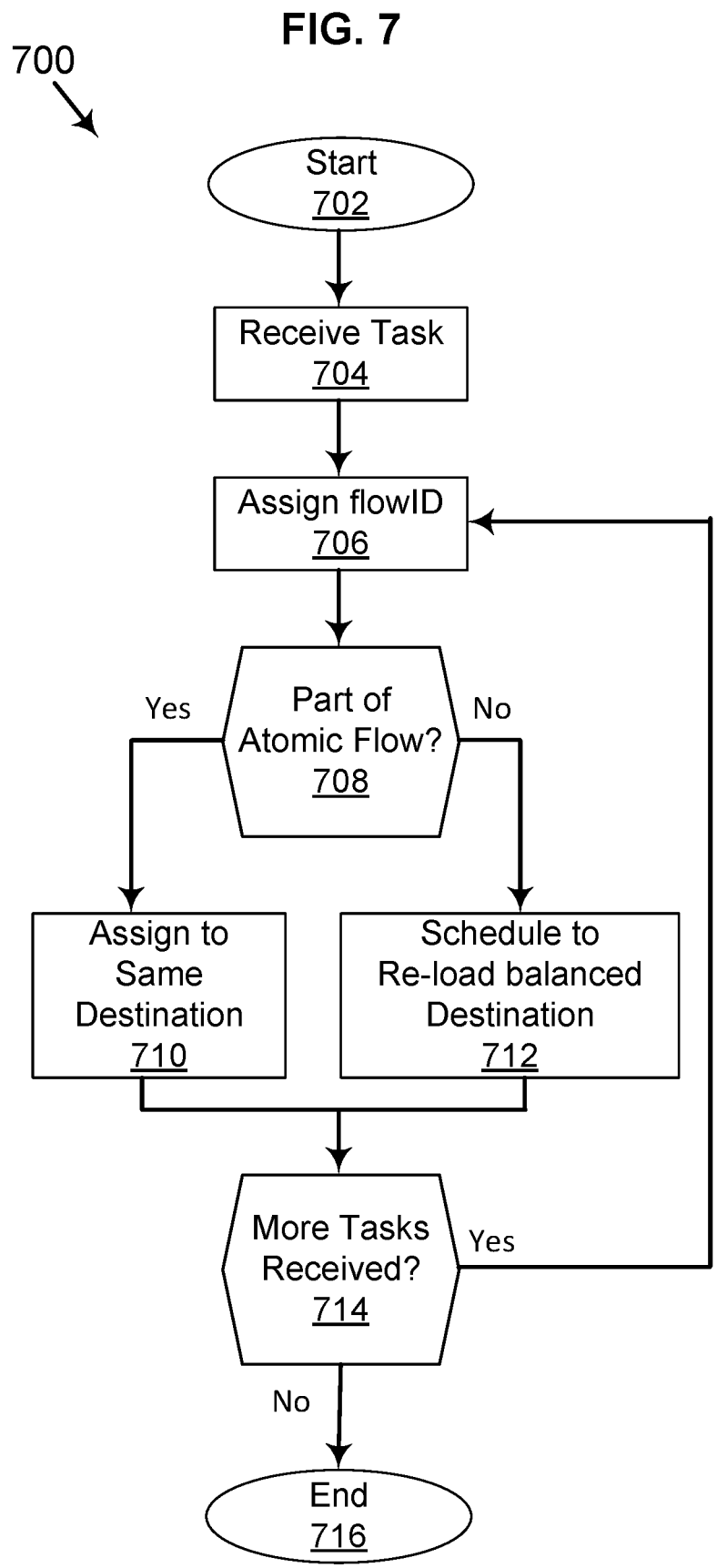
FIG. 7 shows a flow diagram of a work conserving, load balancing, and atomic task scheduling process conducted by a scheduling circuit according to an embodiment.

FIG. 7 shows a flow diagram of a work conserving, load balancing, and atomic task scheduling process conducted by a scheduling circuit according to an embodiment. As illustrated, the process starts at 702. At 704, a task is received, either as a data structure corresponding to a task, or as a packet containing one or more tasks. At 706, based on the contents of the task header, the task is assigned to a flow and receives a flowID. At 708, based on reading a control structure for the flow, it is determined whether the task is part of a critical flow meant to be processed atomically. If so, at 710, if a destination processor has not yet been assigned to the flow, the scheduling circuit conducts a load balancing to select and assign the flow to a destination processor. If, at 710, the flow already has a destination processor assigned to it, the flow is assigned to the same destination processor. If it is determined at 708 that the flow is not part of an atomic flow, then a renewed load balancing is conducted and a new destination processor is selected at 712. At 714, it is determined whether more tasks have been received, and are waiting to be scheduled to a processor. If so, the process returns to 706 to assign a flowID. If not, the process ends at 716.

In some embodiments, the scheduling circuit maintains a state for each flowID. The flowID state can be IDLE, this is the initial state when the first task of the flow is processed and the flowID is created. The flowID state can be in the READY state, waiting to be assigned to a processor. The flowID state can be in the SCHEDULED state, which in some embodiments are flows that currently have tasks enqueued and the flow has been assigned to a processor. In alternate embodiments the flowID state can be SCHEDULED, but for which a destination processor has yet to be selected. The flowID state can be EMPTY, these are flows that have no tasks currently enqueued but tasks have previously been sent to the destination processor or are waiting to be sent to a selected destination processor, and the scheduling circuit is still working on them. If the flowID is a critical flow that needs to be processed atomically, it remains scheduled to a destination processor until the end of the critical sequence. If a flowID is not assigned to a destination processor or is not part of a critical sequence, then it is pushed onto the ready linked list (ready-LL) to be re-load balanced. When flowIDs are in SCHEDULED or EMPTY state they will be pushed onto a scheduled-LL until the destination processor completes all atomic processing (critical range) on the all in-flight tasks. This is to maintain the atomicity of the flowID to the destination processor. The scheduled-LL is indexed by destination processor and priority and the ready-LL is indexed by source processor and priority. In some embodiments, the ready-LL is indexed by the priority and the Source-Processor-ID, mentioned above.

FIG. 8 illustrates states associated with a flowID during enqueuing, scheduling, and processing of a flow according to an embodiment. Upon receiving a task, the scheduling circuit in some embodiments pushes a data structure representing the task to a linked list, task-LL 514, stored in a memory, and increments an enq-cnt. In alternate embodiments, the task is pushed onto a ready-LL in addition to or instead of task-LL 514. In an alternate embodiment, a per-flowID control structure, such as 502 of FIG. 5, indicates whether the flow has tasks pending in one or more of the task-LL 514, the ready-LL 510, and the scheduled-LL 512.

In some embodiments, the scheduling circuit uses a sequential state machine circuit comprising hardware registers to maintain states associated with each flowID. Such a sequential state machine circuit includes hardware registers, such as clocked D flip-flops, to store a "current state." In other embodiments, the state is kept in the flowID control structure. Such a sequential state machine circuit in some embodiments further includes combinational logic circuitry to generate a "next state" by analyzing the "current state" and various input signals. In alternate embodiments, the sequential state machine circuit accesses a look-up table stored in memory and indexed by the "current state" and the inputs, to select a "next state." In some embodiments, the hardware registers of the sequential state machine are driven by a clock and select and store a "next state" during each clock cycle. Use of the sequential state machine circuit in some embodiments allows the scheduling circuit to generate its outputs based on the "current state." The scheduling circuit outputs in some embodiments also reflect input values.

FIG. 12 illustrates a task data structure according to some embodiments. As illustrated, task 1200 typically include one or more task parameters 1201 and task payload 1203. As shown, task parameters 1201 may include one or more of a command type field 1202, a flow ID field 1204, a pipeline ID field 1206, a shared parameter index field 1208, and script data 1209. In general, task parameters 1201 include MTM-specific information for scheduling the incoming task (e.g., command type field 1202, flow ID field 1204, and pipeline ID field 1206). Task payload 1203 include task pointers 1210 and task data 1212. Task pointers 1210 point to addresses in system memory 120 storing data corresponding to the task. Task data 1212 include some of the data corresponding to the task (inline data).

After being created and assigned to one or more tasks, a flowID begins in state 802. When in the IDLE state 802 and (enq-cnt>0), the flowID transitions via arc 818 to READY state 804. Arc 818 is illustrated in FIG. 8 as a dotted line, indicating that it represents an enqueue action. FIG. 8 illustrates scheduling actions and completion actions with a compound line format and dashed line format, respectively. In performing arc 818, according to an embodiment, the scheduling circuit pops a flowID from a task-LL and pushes it onto a linked list, ready-LL, stored in a memory buffer. At this point in the process, the flowID is ready to be, but has not yet been assigned to a destination processor.

When in the READY state 804, according to an embodiment, additional tasks arrive and are added to the ready-LL, as illustrated by arc 830. The scheduling circuit increments enq-cnt after adding such new tasks.

When in the READY state 804 and (enq-cnt>0), the flowID in an embodiment transitions to a SCHEDULED state 806 via arc 822. In conjunction with the state transition 822, the scheduling circuit performs a load balancing to determine a destination processor to which to schedule the flow. Further in conjunction with state transition 822, in an embodiment, the scheduling circuit pops a flowID from the ready-LL, assigns it to the destination processor determined by the load-balancing, decrements enq-cnt, pushes the flow onto linked list, scheduled-LL, increments sch-cnt, and determines if the flow belongs to a critical range of tasks to be processed atomically. The scheduling circuit updates the flowID control structure to reflect at least the current state of the flow, its enq-cnt, its sch-cnt, and its assigned CPU, if any. In some embodiments, the flowID is added, stored in a memory buffer, which in some embodiments is included as part of the hardware accelerator containing the scheduling circuit.

In an alternate embodiment, when in the READY state and there is one task enqueued and ready to be scheduled (enq-cnt==1), the flowID is load-balanced, assigned to a destination processor, and transitions via arc 820 from the READY state directly to the EMPTY state.

When in the SCHEDULED state, a scheduling circuit in an embodiment continues popping tasks from the scheduled-LL as illustrated by arc 810 and, if the tasks belong to a critical sequence of tasks, distributes them to the same assigned destination processor, so as to implement atomic processing. While in the SCHEDULED state, additional tasks associated with the flowID may arrive and be ready to be scheduled, thereby incrementing enq-cnt, as illustrated by arc 812. Also, while in SCHEDULED state, additional tasks may be popped off the task-LL, as illustrated by arc 814, thereby decrementing enq-cnt and incrementing sch-cnt.

The scheduling circuit in an embodiment remains in the SCHEDULED state as long as (sch-cnt>0) and additional tasks are waiting to be assigned to the assigned destination processor. In an embodiment illustrated by arc 824, if (sch-cnt>0) there are tasks waiting to be assigned to a processor, and if those tasks are not part of a critical sequence, the flowID is popped from the scheduled-LL and pushed back onto the ready-LL, allowing those tasks to be re-load balanced and assigned to any destination processor.

When in the SCHEDULED state 806 and enq-cnt=0, the flowID transitions via arc 826 to the EMPTY state 808. As illustrated, in the EMPTY state 808, enq-cnt is equal to zero, meaning there are no additional tasks ready to be assigned to a destination processor. Via arc 816, the scheduling circuit transfers remaining tasks to the assigned destination processor and decrements sch-cnt. When sch-cnt reaches zero, the flowID transitions via arc 830 from the empty state 808 to the idle state 802.

Figure 9:
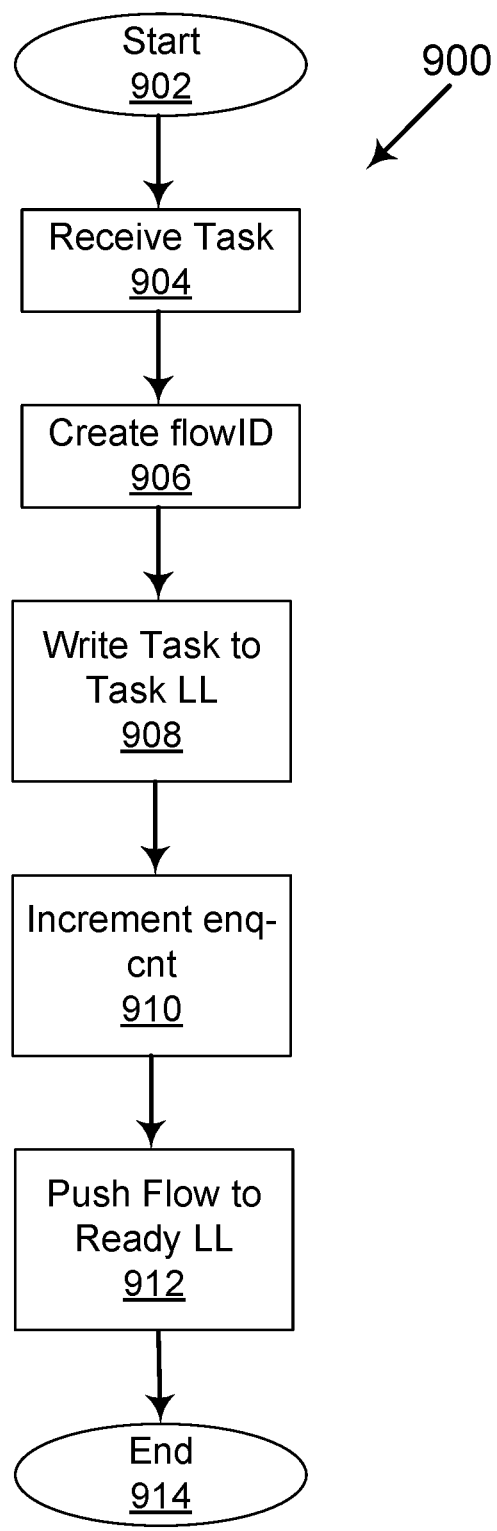
FIG. 9 shows a flow diagram of a process conducted by an enqueue circuit according to an embodiment.

FIG. 9 shows a process conducted by an enqueue circuit according to an embodiment. The process 900 starts at 902. At 904, a task is received, either as a data structure corresponding to a task, a pointer to a task stored in a shared memory, or as a packet containing one or more tasks. At 906, based on the contents of the task header, the task is assigned to a flow and receives a flowID. At 908, the task is pushed onto a linked list, task-LL, which is stored in a shared memory. In alternate embodiments, at 908, the task is stored in a memory buffer. In alternate embodiments, at 908, the task may be stored in a register file. At 910, a counter, enq-cnt, is incremented. At 912, the flowID is pushed to a linked list, ready-LL, which is stored in a shared memory. In alternate embodiments, at 912, the task is stored in a memory buffer. In alternate embodiments, at 912, the task may be stored in a register file. At 914, the process flow ends.

Figure 10:
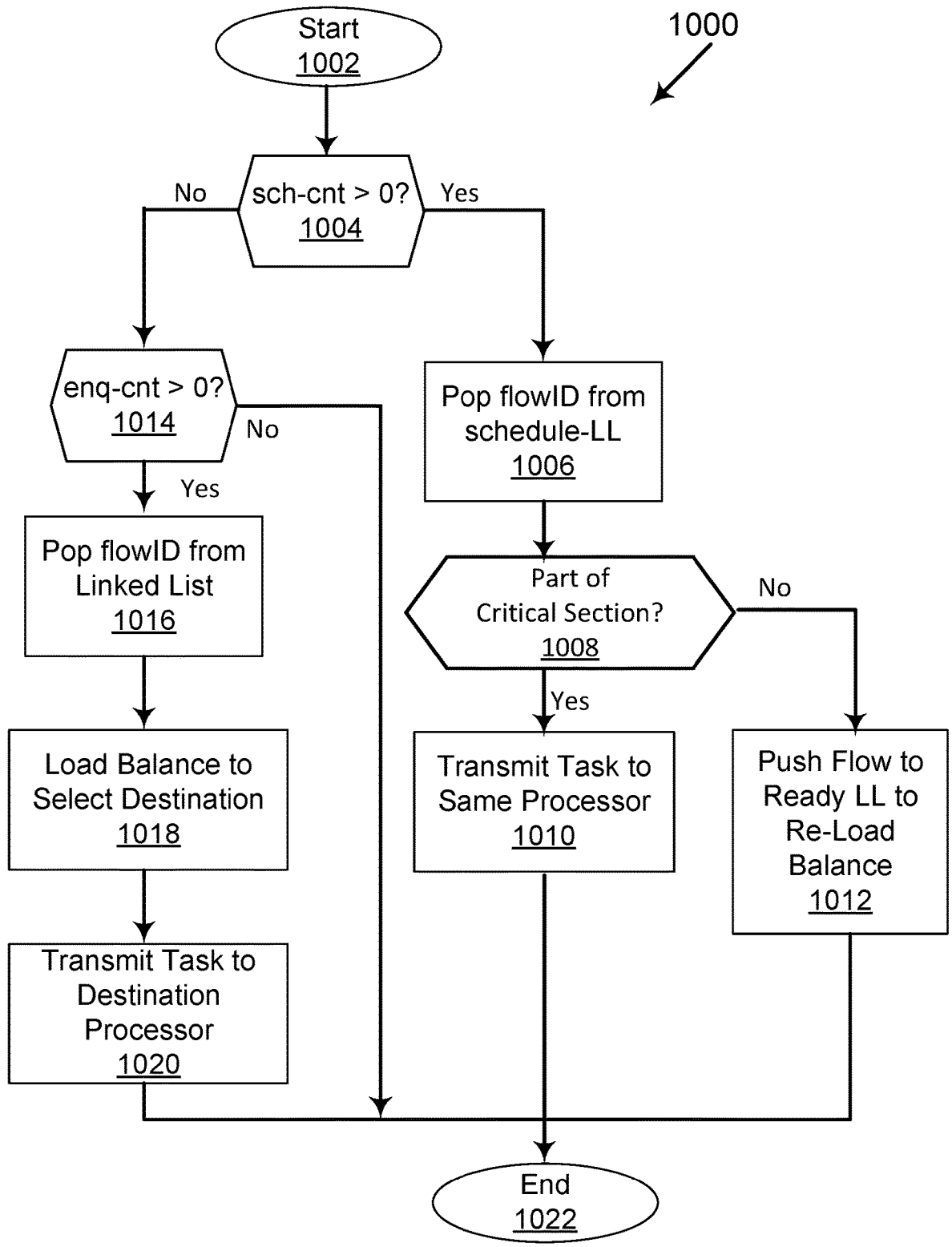
FIG. 10 shows a flow diagram of a process conducted by a scheduler circuit according to an embodiment.

FIG. 10 shows a process conducted by a scheduler circuit according to an embodiment. The process 1000 starts at 1002. At 1004, the scheduler circuit determines whether sch-cnt is greater than zero, indicating that valid tasks are included in the scheduled-LL, and have been or are waiting to be assigned to a destination processor. If so, at 1006, the scheduler circuit pops the flowID from scheduled-LL. At 1008 it is determined whether the flowID is part of a critical sequence of tasks to be atomically processed by a destination processor, in which case at 1010 a task associated with the flowID is transmitted to the same, already assigned processor. If it is determined at 1008 that the flowID is not part of a critical sequence, at 1012 it is pushed back onto the ready-LL to be re-load balanced.

If it is determined at 1004 that sch-cnt is not greater than zero, the scheduler circuit determines at 1014 whether enq-cnt is greater than zero, indicating that valid tasks are enqueued and waiting to be assigned to a destination processor. If so, at 1016, the scheduler circuit pops a flowID from the ready-LL, the task-LL, or the scheduled-LL, depending on which linked list the valid task was added. In one embodiment, the valid task arrived and was enqueued in the ready-LL, which in some embodiments could have occurred while the flow was in the IDLE state or the ENQUEUED state, such as, for example, at arcs 818 or 830 of FIG. 8. In an alternate embodiment, the valid task arrived and was enqueued in the task-LL. In an alternate embodiment, the valid task arrived and was enqueued in the scheduled-LL, which in some embodiments could have occurred while the flow was in the EMPTY or SCHEDULED states, such as, for example, at arcs 812 or 828 of FIG. 8. At 1018, if the popped flowID control structure shows that a destination processor has not yet been assigned, the scheduler circuit load balances to select a destination processor. In an alternate embodiment, not shown, at 1018 the scheduler circuit pushes the flow onto the ready-LL, causing the flow to be re-load balanced there. At 1020, the task is transmitted to destination processor at 1020. The process ends at 1022.

Figure 11:
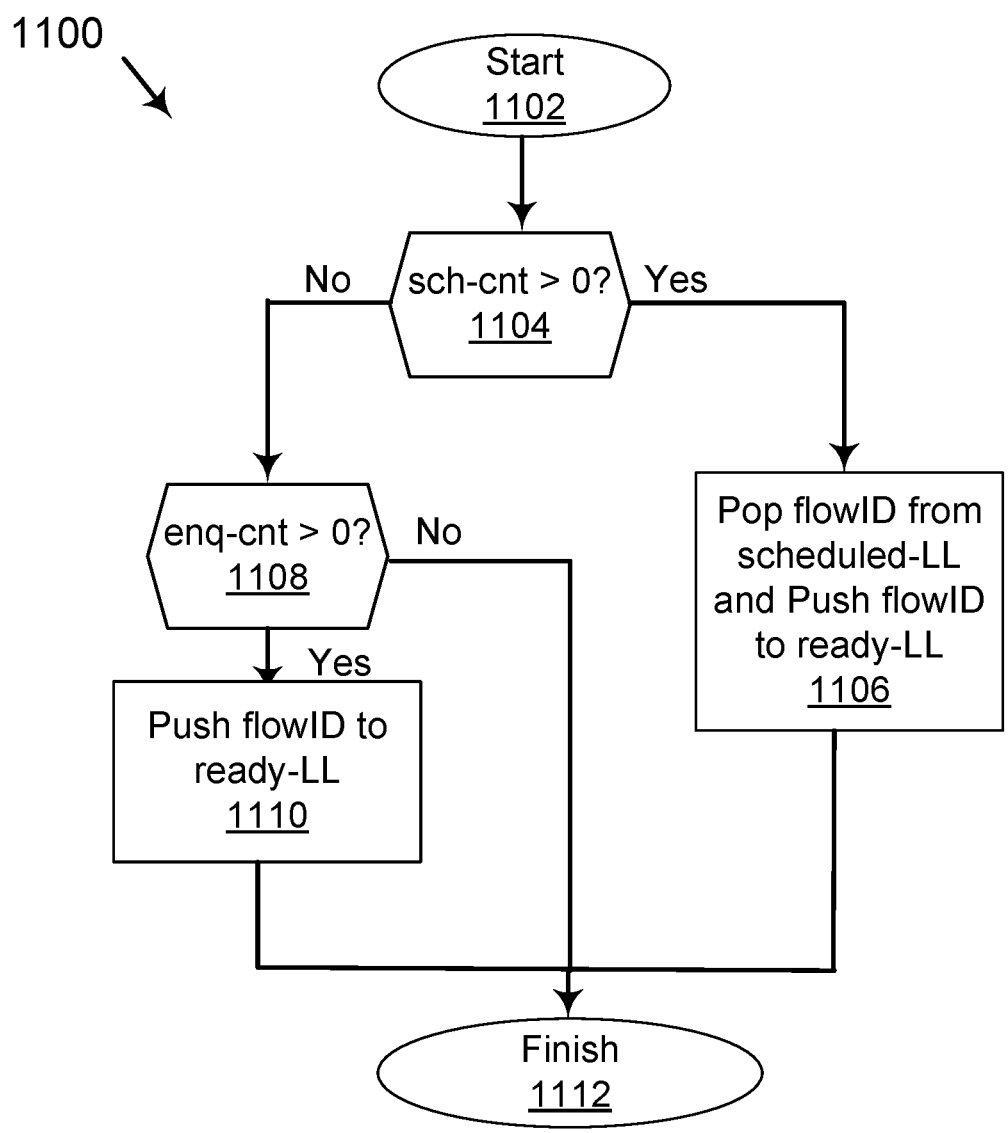
FIG. 11 shows a flow diagram of a process conducted by a completion circuit according to an embodiment.

FIG. 11 shows a process conducted by a completion circuit according to an embodiment. The process 11100 starts at 1102. The process 1100 starts at 1102. At 1104, the completion circuit determines whether sch-cnt is greater than zero, indicating that valid tasks are enqueued in the scheduled-LL, and are waiting to be assigned to a destination processor. If so, at 1106, the completion circuit pops the flowID from scheduled-LL and pushes it onto the ready-LL to be re-load balanced.

If the completion circuit determines at 1104 that sch-cnt is not greater than zero, the completion circuit determines at 1108 whether enq-cnt is greater than zero, indicating that the ready-LL contains valid tasks. If so, at 1110, the completion circuit pops a flowID from ready-LL. The process ends at 1112.

Thus, described embodiments provide load balanced scheduling of tasks to be processed by a plurality of general purpose processors or hardware accelerators. Described embodiments further implement a work-conserving policy to attempt to maximize the use of available processing resources. In alternate embodiments, a power-saving strategy may be implemented by limiting the number of processing cores or hardware accelerators so that some processing cores or hardware accelerators can be powered down.

While the exemplary embodiments have been described with respect to processing blocks in a software program, including possible implementation as a digital signal processor, micro-controller, or general-purpose computer, the described embodiments are not so limited. As would be apparent to one skilled in the art, various functions of software may also be implemented as processes of circuits. Such circuits are employed in, for example, a single integrated circuit, a multi-chip circuit, a single card, or a multi-card circuit pack.

Described embodiments may also be embodied in the form of methods and apparatuses for practicing those methods. Described embodiments may also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the described embodiments. Described embodiments may also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the described embodiments. When implemented on a general-purpose processor, the program code segments combine with the processor to provide a unique device that operates analogously to specific logic circuits. Described embodiments may also be embodied in the form of a bitstream or other sequence of signal values electrically or optically transmitted through a medium, stored magnetic-field variations in a magnetic recording medium, etc., generated using a method and/or an apparatus of the described embodiments.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts that have been described and illustrated in order to explain the nature of the described embodiments may be made by those skilled in the art without departing from the scope of the following claims.

What is claimed is:

1. An apparatus comprising:
   enqueue hardware to extract a task from a network packet and queue the task; and
   a scheduling circuit to:
      associate the task with a flow identifier;
      identify a sequence of tasks associated with the flow identifier;
      detect that the sequence of tasks includes a first subset of tasks that access a shared resource;
      schedule the first subset of tasks to be processed atomically by a first destination processor, the scheduling based on the detection that the first subset of tasks accesses the shared resource;
      detect that a second subset of tasks do not access the shared resource; and
      perform load balancing for the second subset of tasks of the sequence of tasks to select a second destination processor based on the load on the second destination processor.

2. The apparatus of claim 1, wherein the first destination processor is a first destination processing core.

3. The apparatus of claim 1, wherein the load balancing is a work conserving load balancing.

4. The apparatus of claim 1, wherein the task is associated with the flow identifier because its header shares a commonality with other tasks associated with the flow identifier.

5. The apparatus of claim 1, wherein the scheduling circuit is further to assign multiple flows of tasks associated with multiple flow identifiers to a single destination processor, and to cycle through the multiple flows, scheduling tasks from each flow on each cycle.

6. The apparatus of claim 1, wherein the scheduling circuit further includes a sequential state machine circuit including hardware registers to maintain states associated with flow identifiers, the states comprising an IDLE state, a READY state, a SCHEDULED state, and an EMPTY state.

7. The apparatus of claim 1, wherein the shared resource is shared memory.

8. The apparatus of claim 7, wherein the shared memory is dynamically allocated with a block size of one of: 256, 2048, 16384, or 65536.

9. The apparatus of claim 1, wherein the first subset of tasks is scheduled to be processed by the first destination processor during a first time period and the second subset of tasks are scheduled to be processed on the second destination processor during a second time period that does not overlap with the first time period.

10. The apparatus of claim 1, wherein the scheduling circuit is to, after the first subset of tasks finishes execution, cease restriction of the tasks of the sequence of tasks to the first destination processor.

11. An apparatus comprising:
    memory;
    network interface circuitry;
    instructions on the apparatus;
    processor circuitry to execute the instructions to at least:
       extract a task from a network packet;
       queue the task;
       associate the task with a flow identifier;
       identify a sequence of tasks associated with the flow identifier;
       detect that the sequence of tasks includes a first subset of tasks that access a shared resource;
       schedule the subset of tasks to be processed atomically by a first destination processor, the scheduling based on the detection that the first subset of tasks accesses the shared resource;
       detect that a second subset of tasks do not access the shared resource; and
       perform load balancing for a second subset of tasks of the sequence of tasks to select a second destination processor based on the load on the second destination processor.

12. The apparatus of claim 11, wherein the first destination processor is a first destination processing core.

13. The apparatus of claim 11, wherein the load balancing is a work conserving load balancing.

14. The apparatus of claim 11, wherein the task is associated with the flow identifier because its header shares a commonality with other tasks associated with the flow identifier.

15. The apparatus of claim 11, wherein the processor circuitry is further to assign multiple flows of tasks associated with multiple flow identifiers to a single destination processor, and to cycle through the multiple flows, scheduling tasks from each flow on each cycle.

16. The apparatus of claim 11, wherein the processor circuitry further includes a sequential state machine circuit comprising hardware registers to maintain states associated with flow identifiers, the states including an IDLE state, a READY state, a SCHEDULED state, and an EMPTY state.

17. A system comprising:
    first processing cores;
    second processing cores;
    enqueue hardware having at least memory to store instructions that, when executed, cause the enqueue hardware to:
       extract a task from a network packet;

queue the task;
associate the task with a flow identifier;
identify a sequence of tasks associated with the flow identifier;
detect that the sequence of tasks includes a first subset of tasks that access a shared resource;
schedule the subset of tasks to be processed atomically by the first processing core, the scheduling based on the detection that the first subset of tasks accesses the shared resource;
detect that a second subset of tasks do not access the shared resource; and
perform load balancing for a second subset of tasks of the sequence of tasks to select the second processing core based on the load on the second processing core.

18. The system of claim 17, wherein the load balancing is a work conserving load balancing.

19. The system of claim 17, wherein the task is associated with the flow identifier because its header shares a commonality with other tasks associated with the flow identifier.

20. The system of claim 17, wherein the enqueue hardware is further to assign multiple flows of tasks associated with multiple flow identifiers to a single destination processor, and to cycle through the multiple flows, scheduling tasks from each flow on each cycle.

21. The system of claim 17, wherein the enqueue hardware is further includes a sequential state machine circuit comprising hardware registers to maintain states associated with flow identifiers, the states including an IDLE state, a READY state, a SCHEDULED state, and an EMPTY state.

* * * * *